United States Patent
Maiolani et al.

(10) Patent No.: US 9,958,928 B2
(45) Date of Patent: May 1, 2018

(54) METHOD AND APPARATUS FOR CONTROLLING AN OPERATING MODE OF A PROCESSING MODULE

(71) Applicants: Mark Maiolani, East Kilbride (GB); Joseph Circello, Phoenix, AZ (US); Ray Marshall, Harpenden (GB)

(72) Inventors: Mark Maiolani, East Kilbride (GB); Joseph Circello, Phoenix, AZ (US); Ray Marshall, Harpenden (GB)

(73) Assignee: NXP USA, Inc., Austin, TX (US)

( * ) Notice: Subject to any disclaimer, the term of this patent is extended or adjusted under 35 U.S.C. 154(b) by 0 days. days.

(21) Appl. No.: 14/899,190

(22) PCT Filed: Jul. 9, 2013

(86) PCT No.: PCT/IB2013/055637
§ 371 (c)(1),
(2) Date: Dec. 17, 2015

(87) PCT Pub. No.: WO2015/004500
PCT Pub. Date: Jan. 15, 2015

(65) Prior Publication Data
US 2016/0132093 A1    May 12, 2016

(51) Int. Cl.
*G06F 1/32* (2006.01)
*G06F 13/14* (2006.01)
(Continued)

(52) U.S. Cl.
CPC ........... *G06F 1/3234* (2013.01); *G05B 15/02* (2013.01); *G06F 1/329* (2013.01); *G06F 1/3228* (2013.01);
(Continued)

(58) Field of Classification Search
None
See application file for complete search history.

(56) References Cited

U.S. PATENT DOCUMENTS

| 7,596,705 | B2 | 9/2009 | Kim |
| 8,245,062 | B1 * | 8/2012 | Nanda .................. G06F 1/3228 |
| | | | 713/300 |

(Continued)

FOREIGN PATENT DOCUMENTS

CN    101657783 A    2/2010

OTHER PUBLICATIONS

International Search Report and Written Opinion correlating to PCT/IB2013/055637 dated Feb. 18, 2014.
(Continued)

*Primary Examiner* — Jaweed A Abbaszadeh
*Assistant Examiner* — Cheri Harrington

(57) ABSTRACT

A method of controlling an operating mode of at least one processing module. The method comprises receiving an indication of the execution of at least one background task by the at least one processing module, aggregating an execution duration for the at least one background task on the at least one processing module, and configuring a lower power mode for the at least one processing module when the at least one background task is allocated to the at least one processing module for execution thereon if the aggregated execution duration for the at least one background task exceeds a threshold duration within an evaluation period.

18 Claims, 4 Drawing Sheets

(51) Int. Cl.
*G06F 9/48* (2006.01)
*G05B 15/02* (2006.01)

(52) U.S. Cl.
CPC .......... *G06F 1/3287* (2013.01); *G06F 1/3293* (2013.01); *G06F 9/4893* (2013.01); *G06F 13/14* (2013.01); *Y02B 60/121* (2013.01); *Y02B 60/1282* (2013.01); *Y02B 60/144* (2013.01); *Y02B 60/32* (2013.01)

(56) References Cited

U.S. PATENT DOCUMENTS

| | | | |
|---|---|---|---|
| 8,321,693 B2 | 11/2012 | Melpignano et al. | |
| 8,473,724 B1 | 6/2013 | Kenville et al. | |
| 2003/0153368 A1* | 8/2003 | Bussan | H04W 52/0216 455/574 |
| 2004/0181700 A1 | 9/2004 | Katoh et al. | |
| 2005/0076256 A1* | 4/2005 | Fleck | G06F 1/3203 713/320 |
| 2005/0125701 A1 | 6/2005 | Hensbergen et al. | |
| 2006/0236136 A1 | 10/2006 | Jones | |
| 2007/0011479 A1 | 1/2007 | Pessolano | |
| 2009/0019445 A1* | 1/2009 | Oswald | G06F 9/5011 718/104 |
| 2009/0217280 A1 | 7/2009 | Miller et al. | |
| 2009/0282275 A1 | 11/2009 | Yermalayeu et al. | |
| 2010/0185882 A1* | 7/2010 | Arnold | G06F 1/329 713/320 |
| 2012/0210325 A1* | 8/2012 | de Lind van Wijngaarden | H04W 52/0258 718/103 |
| 2012/0260118 A1 | 10/2012 | Jiang et al. | |
| 2013/0042128 A1* | 2/2013 | Berry | G06F 1/3206 713/323 |

OTHER PUBLICATIONS

Kirshnapura et al., "A Dynamic Real-time Scheduling Algorithm for Reduced Energy Consumption," University of Nebraska—Lincoln CSE Technical Reports, May 1, 20114, XP055346885, 35 pages. http:digitalcommons.unl.edu/scetechreports/72.

* cited by examiner

METHOD AND APPARATUS FOR CONTROLLING AN OPERATING MODE OF A PROCESSING MODULE

FIELD OF THE INVENTION

This invention relates to a method of controlling an operating mode of a processing module, and a power mode control module therefor.

BACKGROUND OF THE INVENTION

Minimising both peak and average power consumption is a significant design consideration for many signal processing applications, and the need to balance performance with reduced power consumption is complicated for multi-core systems with increasing levels of parallelism where the performance demanded from the system can no longer be viewed as a single variable over time. Furthermore, for applications that involve timing-critical processes, power reduction techniques are required to have minimal performance impact on those timing-critical processes.

The use of CPU low power modes is known for reducing power consumption within signal processing applications. However, conventional techniques rely on execution of dedicated software to manage low power modes, requiring customisation of software, and introducing latencies in execution of application code. Long application software development times drive the use of a large amount of legacy software, complicating the adoption of new, more sophisticated software-controlled power reduction techniques.

SUMMARY OF THE INVENTION

The present invention provides a method of controlling an operating mode of at least one processing module, a power mode control module for controlling an operating mode of at least one processing module and a signal processing device comprising at least one such power mode control module as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
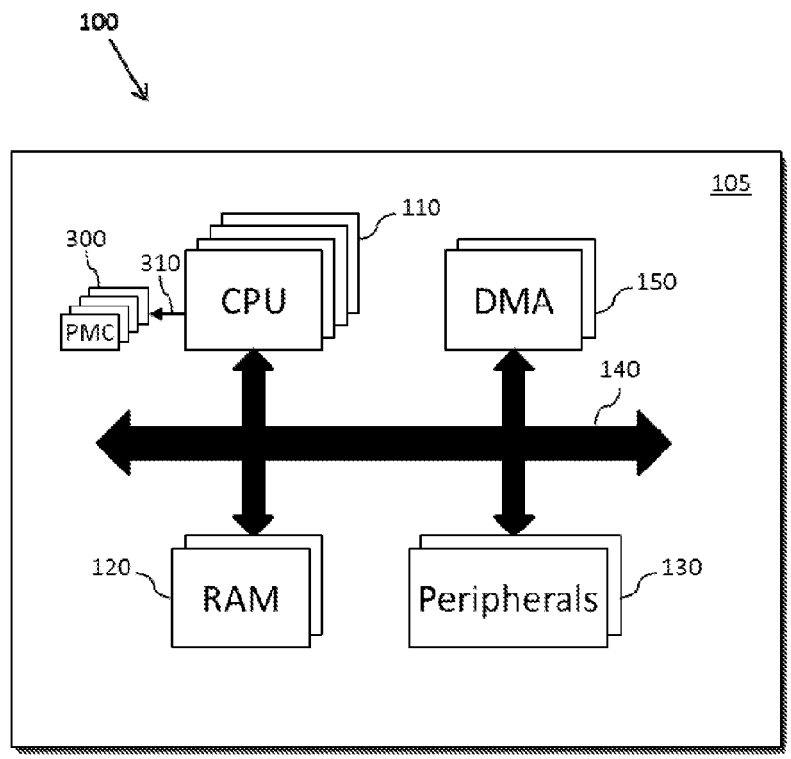
FIG. 1 illustrates a simplified block diagram of an example of a signal processing device.

The present invention will now be described with reference to the accompanying drawings. However, it will be appreciated that the present invention is not limited to the specific examples herein described with reference to the accompanying drawings. For example, the present invention is herein described with reference to a microcontroller unit (MCU), and in particular to an automotive MCU. However, it will be appreciated that the present invention is not limited to being implemented within such an automotive MCU, and it is contemplated that some examples of the present invention may be implemented within alternative signal processing devices such as, by way of example only, microprocessor devices, digital signal processor (DSP) devices, etc.

Furthermore, because the illustrated embodiments of the present invention may, for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

In accordance with some example of a first aspect of the present invention, there is provided a method of controlling an operating mode of at least one processing module. The method comprises receiving an indication of the execution of at least one background task by the at least one processing module, aggregating an execution duration for the at least one background task on the at least one processing module, and configuring a lower power mode for the at least one processing module when the at least one background task has been allocated to the at least one processing module for execution thereon if the aggregated execution duration for the at least one background task exceeds a threshold duration within an evaluation period.

In this manner, by configuring the threshold duration to comprise, say, at least the minimum amount of processing time required for a given period, the execution requirement for such background tasks may be met. However, excessive further execution of the background tasks beyond the predefined threshold duration may be subsequently avoided by configuring the lower power mode for a processing module if further background task execution is indicated after the aggregated execution duration reaches the threshold duration. As such, excessive background execution that is not beneficial may be avoided, thereby also avoiding associated increases in power consumption and reduction in performance caused by increased loading on shared resources.

In one optional example, the indication of the execution of the at least one background task may comprise at least one of:
  a process identifier;
  an instruction fetch address; and
  an interrupt priority level.

In one optional example, the method may comprise aggregating an execution duration for the at least one background task based at least partly on at least one of:
  a clock cycle count value; and
  a timing signal aggregator value.

In one optional example, the method may comprise resetting the aggregated execution duration for the at least one background task upon expiry of the evaluation period.

In one optional example, the lower power mode for the at least one processing module may comprise an inactive mode.

In one optional example, the method may comprise configuring a higher power mode for the at least one processing module when the at least one background task has been allocated to the at least one processing module for execution thereon if the aggregated execution duration for the at least one background task has not exceeded the threshold duration.

In one optional example, the method may comprise configuring a higher power mode for the at least one processing module when at least one timing-critical task is allocated to the at least one processing module for execution thereon if the aggregated execution duration for the at least one background task exceeds the threshold duration.

In accordance with some examples of a second aspect of the present invention, there is provided a power mode control module for controlling an operating mode of at least one processing module. The power mode control module is arranged to receive an indication of the execution of at least one background task by the at least one processing module, aggregate an execution duration for the at least one background task on the at least one processing module, and configure a lower power mode for the at least one processing module when the at least one background task has been allocated to the at least one processing module for execution thereon if the aggregated execution duration for the at least one background task exceeds a threshold duration within an evaluation period.

In one optional example, the power mode control module may be implemented within an integrated circuit device comprising at least one die within a single integrated circuit package.

In accordance with some examples of a third aspect of the present invention, there is provided a signal processing device comprising at least one power mode control module of the second aspect of the present invention.

Referring now to FIG. 1, there is illustrated a simplified block diagram of an example of a signal processing device 100, such as an automotive MCU or the like. The signal processing device 100 may be implemented within an integrated circuit device comprising one or more die(s), 105 within a single integrated circuit package. In the illustrated example, the signal processing device 100 comprises multiple processing modules, illustrated in FIG. 1 by central processing units (CPUs) 110. The CPUs 110 are operably coupled to slave components such as RAM (Random Access Memory) modules 120 and peripheral components illustrated generally at 130, by an interconnect component 140. The signal processing device 100 may further comprise one or more further bus master components, such as DMA (Direct Memory Access) components 150. In accordance with some examples of the present invention, the signal processing device 100 further comprises one or more power mode control (PMC) modules 300, as described in greater detail below.

Figure 2:
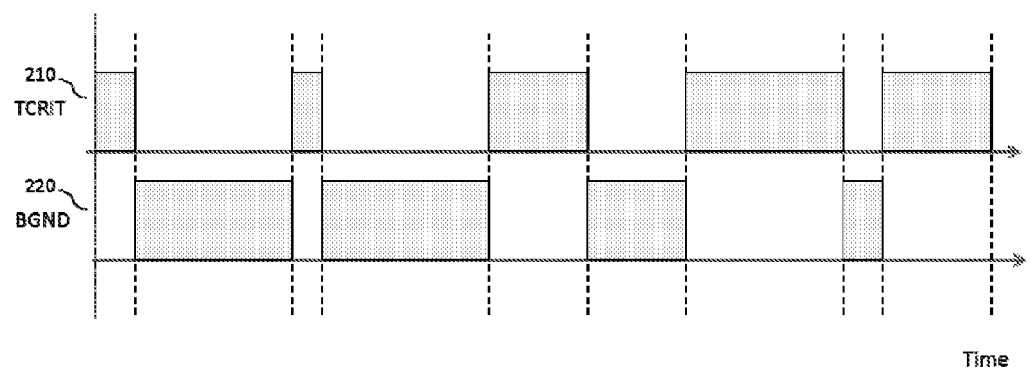
FIG. 2 illustrates a simplified example of the execution of timing-critical and non-timing-critical tasks over time within a signal processing module.

For many applications, timing-critical tasks are initiated by timing or event triggers. For example, in the case of a powertrain application, timing-critical tasks are typically initiated by time or engine position triggers. Conversely, background tasks are executed continuously when timing-critical tasks are not executing. Background tasks are typically organised in a continuous, perhaps long duration loop. FIG. 2 illustrates a simplified example of the execution of timing-critical and non-timing-critical tasks within a processing module over time. In this illustrated example, the execution of timing-critical tasks (TCRIT) 210 is initiated at regular intervals (e.g. every 1 ms, 5 ms, 10 ms, etc.). Additionally, alternatively, execution of timing-critical tasks 210 may be initiated at times corresponding to specific events, such as defined positions of the engine being controlled in the example of a powertrain application. One or more background tasks (BGND) 220 are executed continuously when no timing-critical tasks are being executed, for example performing non-time-critical calculations and housekeeping functions. Thus, as shown in FIG. 2, the processing module is always executing either a critical task (210) or a background task (220).

Typically the only background task execution requirement is to perform a certain minimum amount of processing in a given time period. Any background execution beyond this minimum amount is not beneficial, increases power consumption and reduces performance by increasing loading on shared resources.

Figure 3:
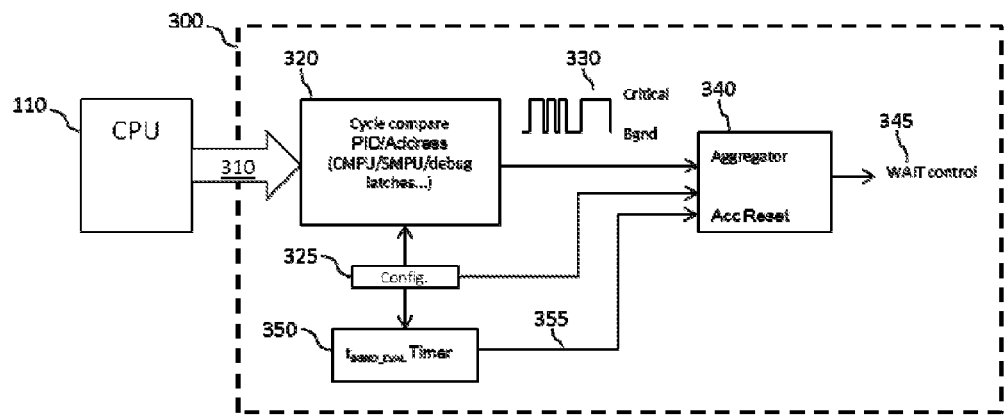
FIG. 3 illustrates a simplified block diagram of an example of a power mode control module.

Referring now to FIG. 3, there is illustrated a simplified block diagram of an example of a power mode control (PMC) module 300, such as may be implemented within the signal processing device 100 of FIG. 1. In the illustrated example, the power mode control module 300 is operably coupled to at least one processing module, such as CPU 110, and arranged to receive an indication 310 of the execution of at least one background task by the CPU 110. The indication 310 of the execution of the at least one background task may comprise any suitable signal/indicator such as, by way of example:
   a process identifier (PID);
   an instruction fetch address;
   an interrupt priority level;
   etc.

In the example illustrated in FIG. 3, the power mode control module 300 comprises a task identification component 320 arranged to receive such an indication 310, and to identify when a background task is being executed by the CPU 110 and when a timing-critical task is being executed by the CPU 110. For example, the task identification component 320 may be operably coupled to a memory element 325 arranged to store therein task type identification information, and the task identification component 320 may be arranged to compare the received indication 310 of the execution of a task by the CPU 110 to the information stored within the memory element 325 to identify whether the task being executed by the CPU 110 comprises a background task or a timing-critical task. In some examples, the task type identification information stored within the memory element 325 may be configurable, for example by software executing on the (or a) CPU 110 of the signal processing device 100. The task identification component 320 is further arranged to output a task type signal 330 comprising an indication of the type (e.g. background or timing-critical) of task being executed by the CPU 110 to an aggregator component 340.

The aggregator component 340 is arranged to receive the task type signal 330 and to aggregate an execution duration for the (or all) background task(s) being executed by the CPU 110. For example, such aggregation of the execution duration for the background task(s) may be based at least partly on the aggregation of a clock cycle count value, a timing signal aggregator value, etc. In some examples, the aggregator component 340 may comprise a counter arranged to be 'enabled' (i.e. to count) when the task type signal 330 indicates the execution of a background task by the CPU 110 and 'disabled' when the task type signal 330 indicates the execution of a timing-critical task by the CPU 110.

The aggregator component 340 is further arranged to configure a lower power mode for the CPU 110 when the/a background task has been allocated to the CPU 110 for execution thereon if the aggregated execution duration for the background task(s) exceeds a threshold duration. In the illustrated example, the aggregator component 340 is arranged to configure such a lower power mode by way of a WAIT control signal 345 which is output by the aggregator component 340 and may be provided to, say, a power management component (not shown) of the signal processing device 100. For example, such a lower power mode may comprise an inactive mode whereby the CPU 110 is not clocked and/or is at least partially powered down. In this manner, upon the aggregated execution duration for the background task(s) exceeding the threshold duration, the aggregator component 340 may 'set' the WAIT control signal 345 if further background task execution is indicated by the task type signal 330, and the power management component (not shown) may receive the WAIT control signal 345 and implement the lower power mode for the CPU 110. In such an example, such a hardware power management component (not shown) may effectively force the CPU 110 to emulate wait instruction execution at the next instruction boundary. Advantageously, such an implementation substantially avoids any requirement for software modification.

Nevertheless, it is contemplated that in some alternative examples, the WAIT control signal 345 output by the aggregator component 340 may alternatively be used to, for example, assert a low-priority interrupt request where its interrupt service routine (ISR) would enter the WAIT mode explicitly. Such an interrupt-driven implementation would provide the advantage of simplification of hardware as compared to the hardware implementation described in the previous paragraph, with required software modifications able to be limited to the specific interrupt handlers rather than requiring modifications to legacy software.

The aggregator component 340 may be further arranged to configure a higher power mode for the CPU 110 when the/a background task has been allocated to the CPU 110 for execution thereon if the aggregated execution duration for the background task(s) does not exceed a threshold duration. For example, such a higher power mode may comprise an active mode whereby the CPU 110 is actively clocked and powered up, and the aggregator component 340 may be arranged to configure a higher power mode for the CPU 110 by 'clearing' the WAIT control signal 345.

In the illustrated example, the threshold duration may be defined by a value stored within, say, memory element 325. In this manner, the threshold duration may be configurable, for example by software executing on the (or a) CPU 110 of the signal processing device 100.

In this manner, by configuring the threshold duration to comprise, say, at least the minimum amount of processing time required for a given period, the execution requirement for such background tasks may be met. However, excessive further execution of the background tasks beyond the predefined threshold duration may be subsequently avoided by configuring the lower power mode for the CPU 110 if further background task execution is indicated by the task type signal 330 after the aggregated execution duration reaches the threshold duration. As such, excessive background execution that is not beneficial may be avoided, thereby also avoiding associated increases in power consumption and reduction in performance caused by increased loading on shared resources.

In order to ensure that the execution requirement of timing-critical tasks are met, the aggregator component 340 may be further arranged to configure a higher power mode for the CPU 110 when a timing-critical task has been allocated to the CPU 110 for execution thereon irrespective of whether the aggregated execution duration for the background task(s) exceeds the threshold duration.

In the illustrated example, the power mode control module 300 is further arranged to reset the aggregated execution duration for the background task(s) upon expiry of an evaluation period. For example, and as illustrated in FIG. 3, the power mode control module 300 may further comprise an evaluation period timer component 350 arranged to output a reset signal 355 upon expiry of each successive evaluation period. The reset signal 355 may be provided to the aggregator component 340. The aggregator component 340 may thus be arranged to reset the aggregated execution duration upon receipt of each reset signal 355 output by the evaluation period timer component 350 indicating the expiry of the evaluation period. In the illustrated example, the evaluation period may be defined by a value stored within, say, memory element 325. In this manner, the threshold duration may be configurable, for example by software executing on the (or a) CPU 110 of the signal processing device 100.

Figure 4:
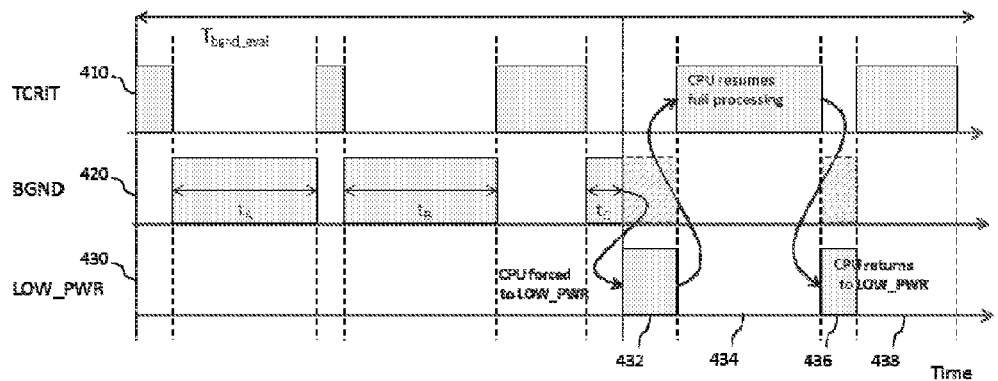
FIG. 4 illustrates a simplified alternative example of the execution of timing-critical and non-timing-critical tasks within a signal processing module.

FIG. 4 illustrates a simplified example of the execution of timing-critical and non-timing-critical tasks within the CPU 110 in accordance with some examples of the present invention. In this illustrated example, the execution of timing-critical tasks (TCRIT) 410 is initiated at regular intervals (e.g. every 1 ms, 5 ms, 10 ms, etc.). Additionally/alternatively, execution of timing-critical tasks 410 may be initiated at times corresponding to specific events, such as defined positions of the engine being controlled in the example of a powertrain application. One or more background tasks (BGND) 420 may be executed continuously when no timing-critical tasks are being executed, for example, performing non timing-critical calculations and housekeeping functions.

However, in the example illustrated in FIG. 4, execution duration for the background task(s) is aggregated, such as described above in relation to FIG. 3. When the aggregated execution duration for the background task(s) exceeds a threshold duration, a lower power (e.g. inactive) mode (LOW_PWR) for the CPU 110 is configured when the background task(s) has/have been allocated to the CPU 110 for execution. In the example illustrated in FIGS. 3 and 4, when the aggregated background task execution duration exceeds the threshold duration (i.e. when count $(t_A+t_B+t_C)>t_{bgnd\_threshold}$), the power mode control module 300 sets the WAIT control signal 345, configuring the CPU 110 into a lower power (e.g. inactive) mode, as illustrated at 432 in FIG. 4, whilst the background task(s) has/have been allocated to the CPU 110 for execution. In this manner, excessive background execution that is not beneficial may be avoided, thereby also avoiding associated increases in power consumption and reduction in performance caused by increased loading on shared resources.

Upon a timing-critical task being subsequently allocated to the CPU 110 for execution, the power mode control module 300 may configure a higher power mode for the CPU 110, for example by 'clearing' the WAIT control signal 345, as illustrated at 434 and 438. In this manner, execution requirements for timing-critical tasks may be fulfilled. Upon completion of the timing-critical tasks, the background task(s) is/are allocated to the CPU 110 for execution, at which point the power mode control module 300 may reconfigure a lower power mode for the CPU 110 (since the aggregated background task execution duration exceeds the threshold duration), for example by resetting the WAIT control signal 345, as illustrated at 436.

As mentioned above, in some examples the WAIT control signal 345 output by the power mode control module 300 may be used to assert a low-priority interrupt request where its interrupt service routine (ISR) would enter the WAIT mode explicitly. In such examples, the low-priority interrupt request that is implemented by way of the WAIT control signal 345 may be automatically overridden when a timing-critical task is allocated to the CPU 110 for execution by virtue of the timing-critical task asserting a higher priority level. Accordingly, in such examples, the power mode control module 300 need not clear the WAIT control signal 345 upon a timing-critical task being subsequently allocated to the CPU 110 for execution.

As previously mentioned with reference to FIG. 3, the aggregated background task execution duration value may be periodically reset (e.g. reinitialised to a value of zero). Upon the aggregated background task execution duration value being reset, the power mode control module 300 clears the WAIT control signal 345, enabling a higher power mode for the CPU 110 during allocated execution of the background task(s) until the aggregated background task execution duration value once again exceeds the threshold duration value.

Figure 5:
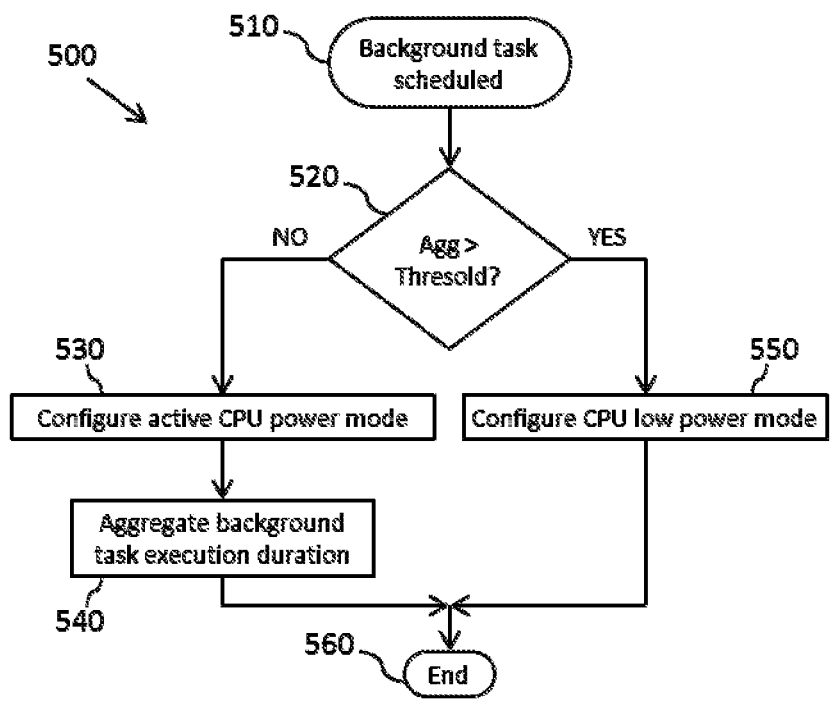
FIGS. 5 to 8 illustrate simplified flowcharts of an example of a method of controlling an operating mode of at least one processing module.

Referring now to FIGS. 5 to 8, there are illustrated simplified flowcharts 500, 600, 700, 800 of an example of a method of controlling an operating mode of at least one processing module, such as may be implemented by way of the power mode control module 300 illustrated in FIG. 3. Referring first to FIG. 5, this part of the method starts at 510 with the scheduling of a background task for execution by the processing module. Next, at 520, it is determined whether the aggregated background task execution duration has exceeded the threshold duration value. If the aggregated background task execution duration has not exceeded the threshold duration value, the method moves on to 530 where a higher power (active) mode for the processing module is configured. Background task execution duration is then aggregated at 540, and this part of the method ends at 560. Referring back to 520, if the aggregated background task execution duration has exceeded the threshold duration value, the method moves on to 550 where a lower power (e.g. inactive) mode for the processing module is configured. This part of the method then ends at 560.

Figure 6:
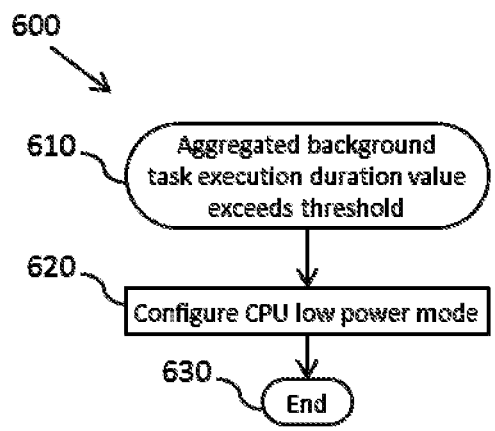

Referring now to FIG. 6, this part of the method starts at 610 with the aggregated background task execution duration value exceeding the threshold duration value during execution of a background task. Upon the aggregated background task execution duration exceeding the threshold duration value during execution of a background task, the method moves on to 620 where a lower power (e.g. inactive) mode for the processing module is configured. This part of the method then ends at 630.

Figure 7:
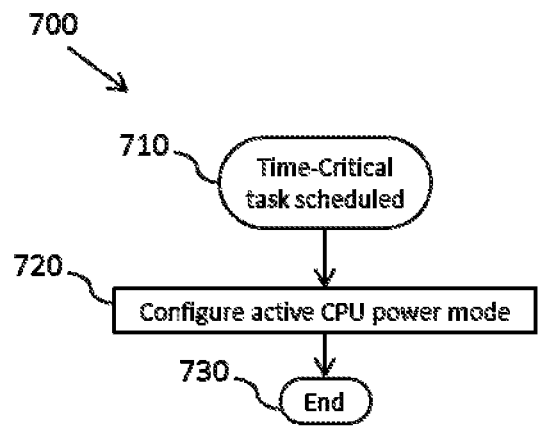

Referring now to FIG. 7, this part of the method starts at 710 with the scheduling of a timing-critical task, upon which a higher power (active) mode for the processing module is configured at 720. This part of the method then ends at 730.

Figure 8:
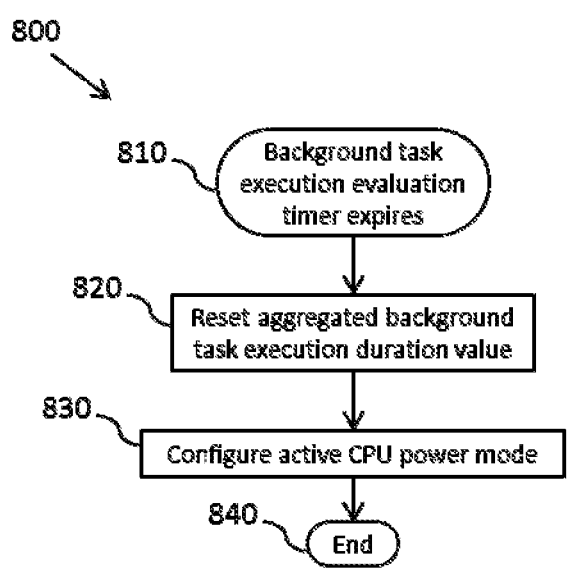

Referring now to FIG. 8, this part of the method starts at 810 with the expiration of the background task execution evaluation timer, and moves on to 820 where the aggregated background task execution duration value is reset. A higher power (active) mode for the processing module is configured at 830. This part of the method then ends at 840.

It will be apparent that a method and apparatus for controlling the operating modes of processing modules have been described that enable the power consumption of such processing modules to be reduced through the use of low power modes during background task execution in a highly automated and simple manner, avoiding or substantially minimising the need for software customisation and incurring minimal or zero performance impact to timing-critical tasks. Furthermore, the method and apparatus herein described substantially avoid the need to perform detailed application characterisation, and as such may be easily used in relation to multiple applications.

In some examples, the method of controlling the operating mode of a processing module may be implemented on a per processing module basis. For example a power mode control module 300 such as illustrated in FIG. 3 may be implemented for each processing module (CPU 110). Alternatively, the power mode control module 300 may be arranged to receive indications 310 of the execution background tasks from a plurality of processing modules (CPUs 110), and to individually configuring lower power modes for the processing modules when the aggregated execution durations for the background tasks exceed a threshold duration within an evaluation period.

It will be appreciated that the aggregation of the background task execution duration for a processing module may comprise incremental accumulation of background task execution time whereby the background task execution duration value is increased as background task(s) is/are executed. In this manner the power mode control module 300 may be arranged to configure a lower power mode for the processing module 100 when the aggregated execution duration for the background task(s) exceeds a positive threshold duration value, with the periodic resetting of the background task execution duration value to, say, zero.

Alternatively, the aggregation of the background task execution duration for a processing module 100 may comprise decremental accumulation of background task execution time whereby the background task execution duration value is reduced as background task(s) is/are executed. In this manner, the power mode control module 300 may be arranged to configure a lower power mode for the process module when the aggregated execution duration for the background task(s) reaches a threshold duration value of, say, zero, with the periodic resetting of the background task execution duration value to, say, a positive threshold duration value.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "enable", "assert" or "set" and "negate" (or "disable" or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of controlling an operating mode of at least one processing module; the method comprising:
    receiving an indication of the execution of at least one background task by the at least one processing module;
    aggregating an execution duration for the at least one background task on the at least one processing module;
    determining whether the aggregated execution duration for the at least one background task exceeds a threshold duration within one of a plurality of repeated evaluation periods; and
    if the aggregated execution duration for the at least one background task exceeds a threshold duration within one of the repeated evaluation periods:
        switching a power mode for the at least one processing module to a lower power mode from a higher power mode when the at least one background task is allocated to the at least one processing module for execution thereon;
        while the at least one processing module is in the lower power mode, switching the at least one processing module from the lower power mode to the higher power mode when a timing-critical task is allocated to the at least one processing module for execution thereon;
        receiving a reset signal in response to an expiration of the one of the repeated evaluation periods; and
        resetting the aggregated execution duration for the at least one background task in response to receiving the reset signal.

2. The method of claim 1, wherein the indication of the execution of the at least one background task comprises at least one of:
    a process identifier;
    an instruction fetch address; and
    an interrupt priority level.

3. The method of claim 1, wherein the method comprises aggregating the execution duration for the at least one background task based at least partly on at least one of:
    a clock cycle count value; and
    a timing signal aggregator value.

4. The method of claim 1, wherein the lower power mode for the at least one processing module comprises an inactive mode.

5. The method of claim 1, wherein the method comprises configuring the higher power mode for the at least one processing module when the at least one background task is allocated to the at least one processing module for execution thereon if the aggregated execution duration for the at least one background task does not exceed the threshold duration.

6. The method of claim 1, wherein the method comprises configuring the lower power mode for the at least one processing module by way of a WAIT control signal provided to a hardware power management component.

7. The method of claim 1, wherein the method comprises configuring the lower power mode for the at least one processing module by way of a low-priority interrupt request.

8. Power mode control circuitry to control an operating mode of a processing module, the power mode control circuitry to:
   receive an indication of the execution of at least one background task by the at least one processing module;
   aggregate an execution duration for the at least one background task on the at least one processing module; and
   determine whether the aggregated execution duration for the at least one background task exceeds a threshold duration within one of a plurality of repeated evaluation periods; and
   if the aggregated execution duration for the at least one background task exceeds a threshold duration within one of the repeated evaluation periods:
      switch a power mode for the at least one processing module to a lower power mode from a higher power mode when the at least one background task is allocated to the at least one processing module for execution thereon;
      while the at least one processing module is in the lower power mode, switch the at least one processing module from the lower power mode to the higher power mode when a timing-critical task is allocated to the at least one processing module for execution thereon;
      receive a reset signal in response to an expiration of the one of the repeated evaluation periods; and
      reset the aggregated execution duration for the at least one background task in response to receiving the reset signal.

9. The power mode control circuitry of claim 8 implemented within an integrated circuit device comprising at least one die within a single integrated circuit package.

10. A signal processing device comprising at least one power mode control circuitry according to claim 8.

11. The power mode control circuitry of claim 8, wherein the indication of the execution of the at least one background task comprises at least one of:
   a process identifier;
   an instruction fetch address; and
   an interrupt priority level.

12. The power mode control circuitry of claim 8, wherein the aggregation of the execution duration for the at least one background task is based at least partly on at least one of:
   a clock cycle count value; and
   a timing signal aggregator value.

13. The power mode control circuitry of claim 8, wherein the lower power mode for the at least one processing module comprises an inactive mode.

14. The power mode control circuitry of claim 8, wherein the power mode control circuitry further to configure the higher power mode for the at least one processing module when the at least one background task is allocated to the at least one processing module for execution thereon if the aggregated execution duration for the at least one background task does not exceed the threshold duration.

15. The power mode control circuitry of claim 8, wherein the power mode control circuitry further to configure the lower power mode for the at least one processing module by way of a WAIT control signal provided to a hardware power management component.

16. The power mode control circuitry of claim 8, wherein the power mode control circuitry further to configure the lower power mode for the at least one processing module by way of a low-priority interrupt request.

17. A method of controlling an operating mode of a processing module, the method comprising:
   receiving an indication of the execution of first and second background tasks by the processing module;
   aggregating an execution duration for the first and second background tasks on the processing module;
   determining whether the aggregated execution duration for the at least one background task exceeds a threshold duration within one of a plurality of repeated evaluation periods; and
   if the aggregated execution duration for the first and second background tasks exceeds a threshold duration within one of the repeated evaluation periods:
      switching a power mode for the at least one processing module to a lower power mode from a higher power mode when the first and second background tasks are allocated to the at least one processing module for execution thereon;
      while the at least one processing module is in the lower power mode, switching the at least one processing module from the lower power mode to the higher power mode when a timing-critical task is allocated to the at least one processing module for execution thereon;
      receiving a reset signal in response to an expiration of a timer of a first evaluation period of the one of the repeated evaluation periods; and
      resetting the aggregated execution duration for the first and second background tasks in response to receiving the reset signal.

18. The method of claim 17, wherein a second evaluation period of the one of the repeated evaluation periods begins after the reset signal is received.

* * * * *